(12) United States Patent
Tachikawa et al.

(10) Patent No.: US 8,092,211 B2
(45) Date of Patent: Jan. 10, 2012

(54) VERTICAL TYPE INJECTION MOLDING MACHINE

(75) Inventors: Shunji Tachikawa, Aichi-ken (JP);
Munehiro Takagi, Aichi-ken (JP);
Mineo Hayakawa, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 59 days.

(21) Appl. No.: 12/643,368

(22) Filed: Dec. 21, 2009

(65) Prior Publication Data

US 2010/0159063 A1   Jun. 24, 2010

(30) Foreign Application Priority Data

Dec. 22, 2008   (JP) ................................ 2008-326324

(51) Int. Cl.
*B29C 45/64* (2006.01)
(52) U.S. Cl. ..................................... 425/589; 425/450.1
(58) Field of Classification Search .................. 425/589, 425/450.1
See application file for complete search history.

(56) References Cited

U.S. PATENT DOCUMENTS

| 2,431,048 A | * | 11/1947 | Kilborn | 425/338 |
| 2003/0077355 A1 | * | 4/2003 | Laar | 425/592 |

FOREIGN PATENT DOCUMENTS

| JP | 05-092432 A | 4/1993 |
| JP | 08-052756 A | 2/1996 |

* cited by examiner

*Primary Examiner* — James Mackey
(74) *Attorney, Agent, or Firm* — Posz Law Group, PLC (57) ABSTRACT

A vertical type injection molding machine includes a fixed mold, a movable body, a lift mechanism, a plurality of weights, and a plurality of pulleys is provided. The fixed mold is supported by a support frame provided on a base. The movable body includes a movable mold. The movable mold is approached to and moved away from the fixed mold. The lift mechanism lifts and lowers the movable body, thereby causing the movable mold to approach and move away from the fixed mold. The weights function as a counterweight of the movable body. The total weight of the weights is the same as the weight of the movable body. Each weight is coupled to the movable body by a wire. The pulleys are provided in an upper portion of the support frame. One of the wires is placed over each pulley. Each wire connects the corresponding weight to the movable body.

3 Claims, 7 Drawing Sheets

VERTICAL TYPE INJECTION MOLDING MACHINE

BACKGROUND OF THE INVENTION

The present invention relates to a vertical type injection molding machine that reduces the load on a motor that drives a movable mold.

Conventional injection molding machines include horizontal types in which clamping is performed along the installation surface, or along the horizontal direction and vertical types in which clamping is performed along the vertical direction. Since the movable mold of a horizontal type injection molding machine is moved horizontally, the movable mold is hardly influenced by the gravity unlike the movable mold in a vertical type injection molding, which is moved vertically. Thus, in a horizontal type injection molding machine, load imposed on the motor driving the movable mold is small, and the motor thus operates in a stable manner. On the other hand, since the movable mold in a horizontal type injection molding machine is permitted to move horizontally, the footprint of the machine is relatively large.

Vertical type injection molding machines are advantageous over horizontal type injection molding machines because of the smaller footprints. However, since the movable mold of a vertical type injection molding machine is greatly influenced by the gravity, the load imposed on the motor that drives the movable mold is relatively great. Accordingly, in order to reduce the load acing on the motor, for example, Japanese Laid-Open Patent Publication No. 08-52756 discloses a vertical type injection molding machine 100 including a fixed mold 101 and a movable mold 105 as shown in FIG. 8.

Figure 8:
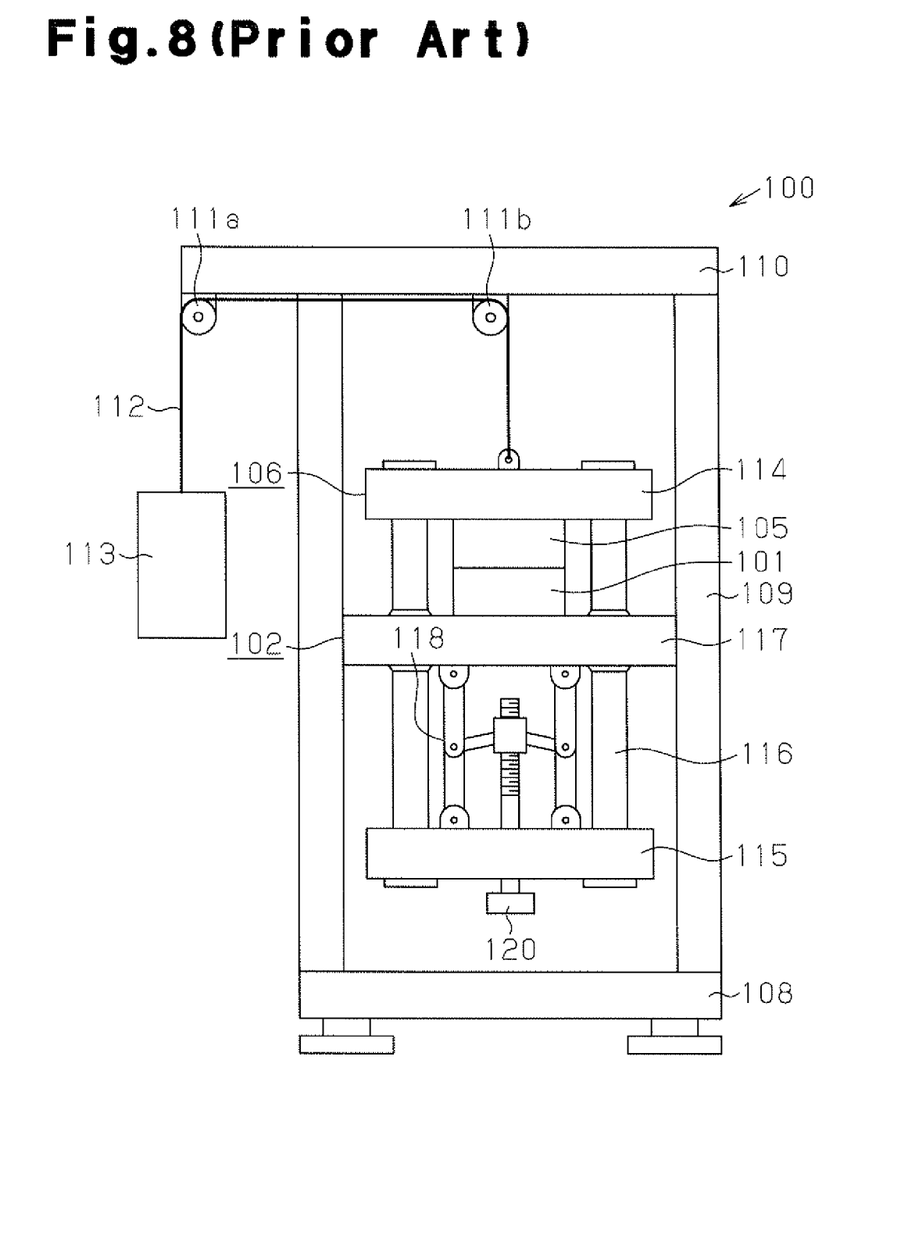
FIG. 8 is a front view illustrating a prior art vertical type injection molding machine.

The vertical type injection molding machine 100 of FIG. 8 has a base 108 placed on the installation surface. Four support pillars 109 extend from the base 108. A ceiling portion 110 is provided on the support pillars 109. A stationary platen 117, which is fixed to the support pillars 109, is provided between the base 108 and the ceiling portion 110. The fixed mold 101 is fixed to and supported on the stationary platen 117, which has an upper surface parallel to the upper surface of the base 108. The stationary platen 117 support tie bars 116 that extend along the thickness of the stationary platen 117, or along the vertical direction, such that the tie bars 116 can slide along the vertical direction. The upper ends and the lower ends of the tie bars 116 are fixed to and support an upper platen 114 and a lower platen 115, respectively. The movable mold 105 is fixed to and supported on the lower surface of the upper platen 114 so as to face the fixed mold 101. Therefore, the upper platen 114, the lower platen 115, the tie bars 116, and the movable mold 105 are integrally raised and lowered, so as to form a movable body 106, which moves in the vertical direction. On the other hand, the stationary platen 117 and the fixed mold 101 form a fixed body 102.

Two pulleys 111a, 111b are provided on the lower surface of the ceiling portion 110. The first pulley 111a is located at an edge of the ceiling portion 110 (left edge as seen in FIG. 8), and the second pulley 111b is located substantially at the center of the ceiling portion 110. A wire 112 is placed over the pulleys 111a, 111b. An end of the wire 112 located closer to the first pulley 111a is connected to a weight 113 the weight of which is the same as the weight of the movable body 106. An end of the wire 112 located closer to the second pulley 111b is connected to the upper platen 114 of the movable body 106.

A mover mechanism 118 is provided between the stationary platen 117 and the lower platen 115. The mover mechanism 118 is driven by a motor 120 located below the lower platen 115 so as to move the movable body 106 in the vertical direction. Accordingly, the movable mold 105 is either brought closer to or moved away from the fixed mold 101.

The movable body 106 is pulled upward by a force corresponding to the weight of the weight 113 through the wire 112. Since the weight of the weight 113 is the same as that of the movable body 106, the movable body 106 and the weight 113 are balanced through the wire 112. That is, the movable body 106 never free-falls due to its own weight. Therefore, the motor 120 does need to be operated in order to maintain the movable body 106 at a prescribed position. This reduces the load imposed on the motor 120, which drives the movable body 106.

At injection molding using the injection molding machine 100, the movable mold 105 is clamped onto the fixed mold 101, and molten resin is injected into the cavity between the molds 101, 105 under a high pressure. The fixed mold 101 and the movable mold 105 are designed to be large and heavy so as not be deformed by molten resin that is injected under a high pressure. Since the wire 112 and the pulleys 111a, 111b support the weight 113 that weighs the same as the movable body 106, in addition to the movable body 106 including the heavy movable mold 105, the wire 112 might be stretched, and the pulleys 111a, 111b might be deformed. Extension of the wire 112 and deformation of the pulleys 111a, 111b hinders smooth rising and descending of the movable mold 105. As a result, the load imposed on the motor 120 is increased, making the operation of the injection molding machine 100 unstable.

SUMMARY OF THE INVENTION

Accordingly, it is an objective of the present invention to provide a vertical type injection molding machine that ensures stable operation of injection molding for an extended period of time.

To achieve the foregoing objective and in accordance with one aspect of the present invention, a vertical type injection molding machine including a fixed mold, a movable body, a lift mechanism, a plurality of weights, and a plurality of pulleys is provided. The fixed mold is supported by a support frame provided on a base. The movable body includes a movable mold. The movable mold is approached to and moved away from the fixed mold. The lift mechanism lifts and lowers the movable body, thereby causing the movable mold to approach and move away from the fixed mold. The weights function as a counterweight of the movable body. The total weight of the weights is the same as the weight of the movable body. Each weight is coupled to the movable body by a wire. The pulleys are provided in an upper portion of the support frame. One of the wires is placed over each pulley. Each wire connects the corresponding weight to the movable body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 7.

Figure 1:
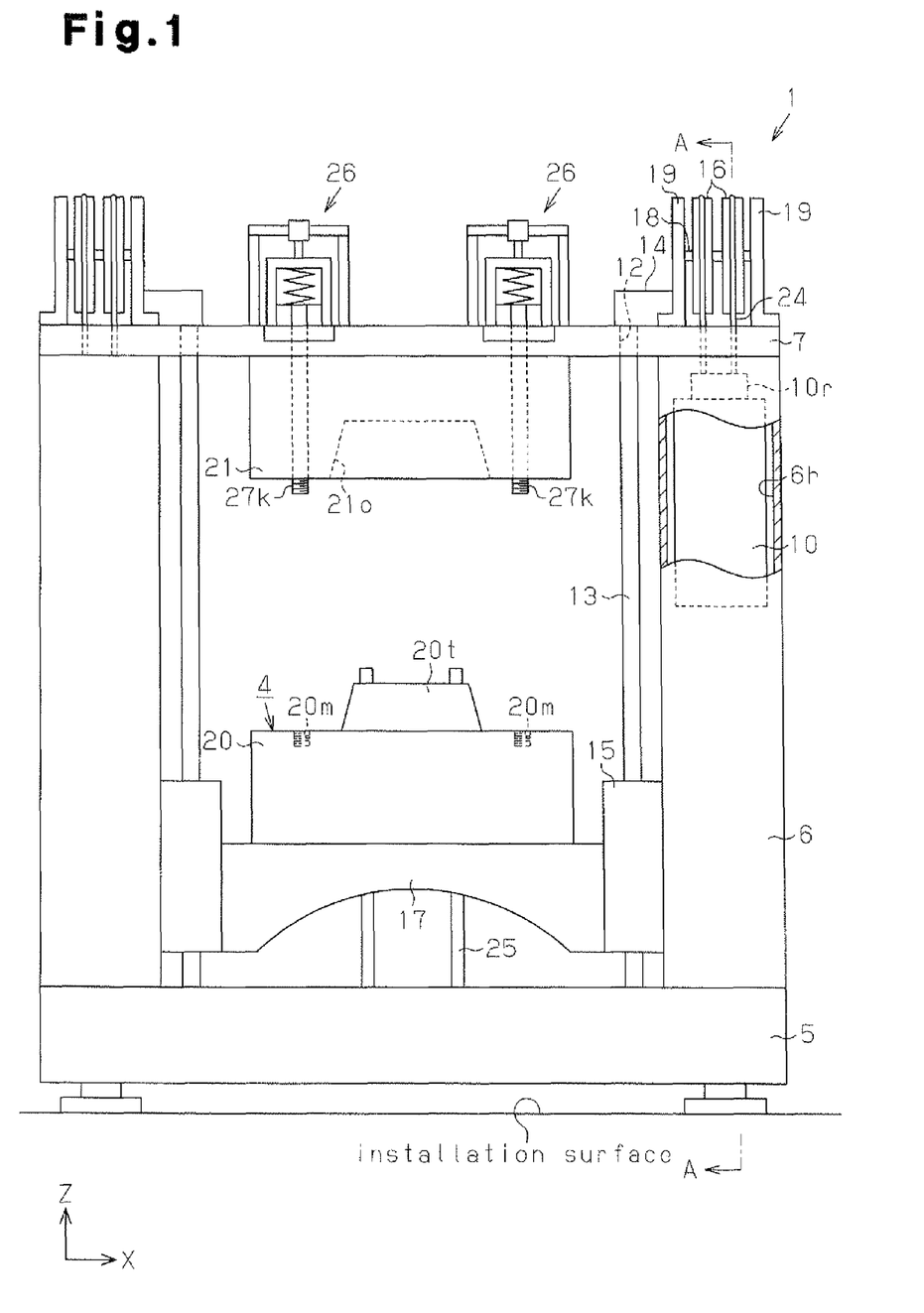
FIG. 1 is a front view illustrating a vertical type injection molding machine according to one embodiment of the present invention, showing a state where the molds are open.

A vertical type injection molding machine 1 according to the present embodiment shown in FIG. 1 has a base 5 placed on an installation surface on which the injection molding machine 1 is installed. Four support pillars 6, which serve as a support frame, extend vertically, or the direction of arrow Z in FIG. 1, from a rectangular upper surface of the base 5. Each support pillar 6 has a polygonal cross section. The support pillars 6 are arranged at four corners of the upper surface of the base 5. A ceiling portion 7 is provided on the support pillars 6. That is, the ceiling portion 7 is supported by the support pillars 6.

Figure 3:
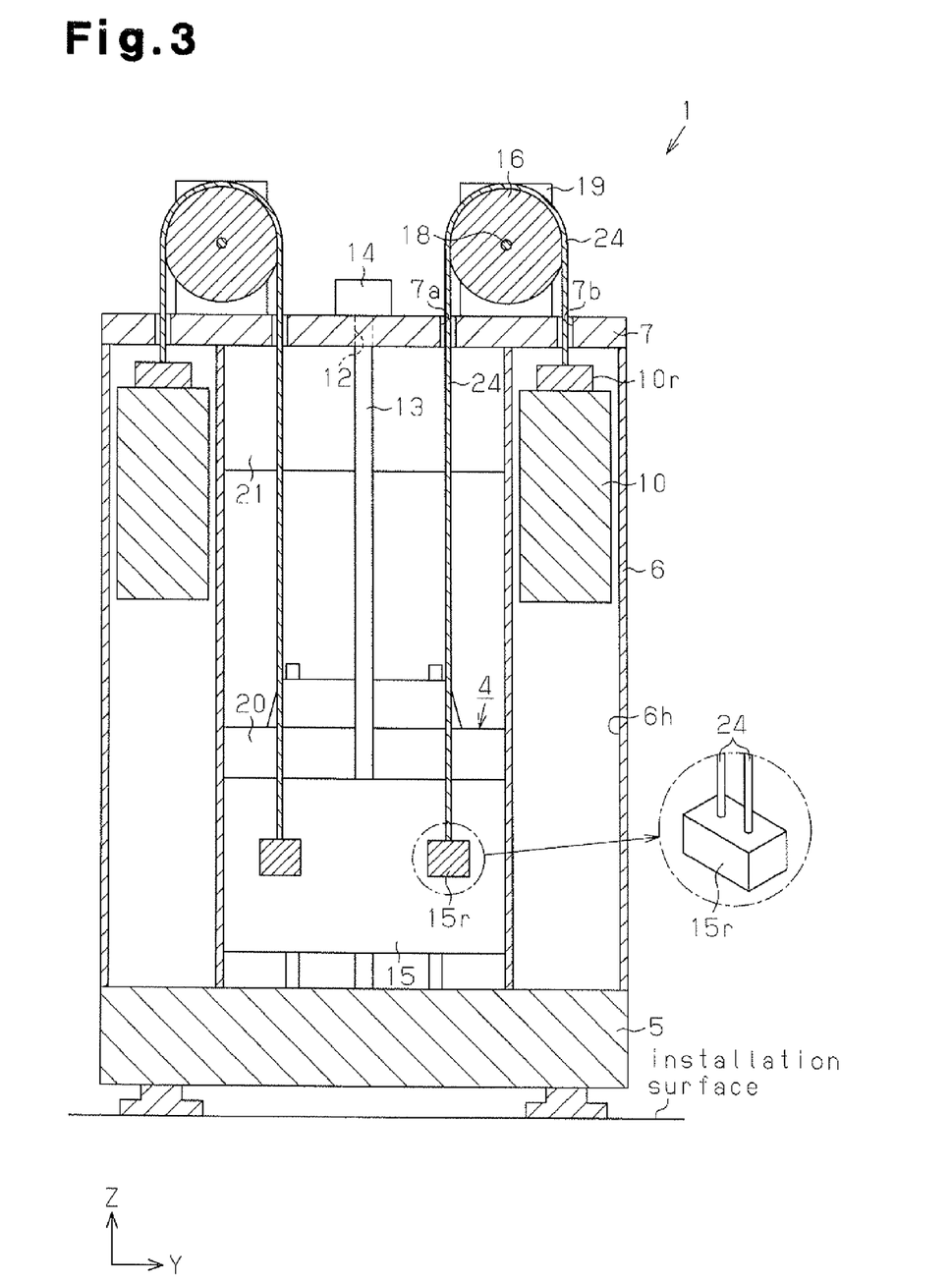
FIG. 3 is a cross-sectional view taken along line A-A of FIG. 1.
Figure 4:
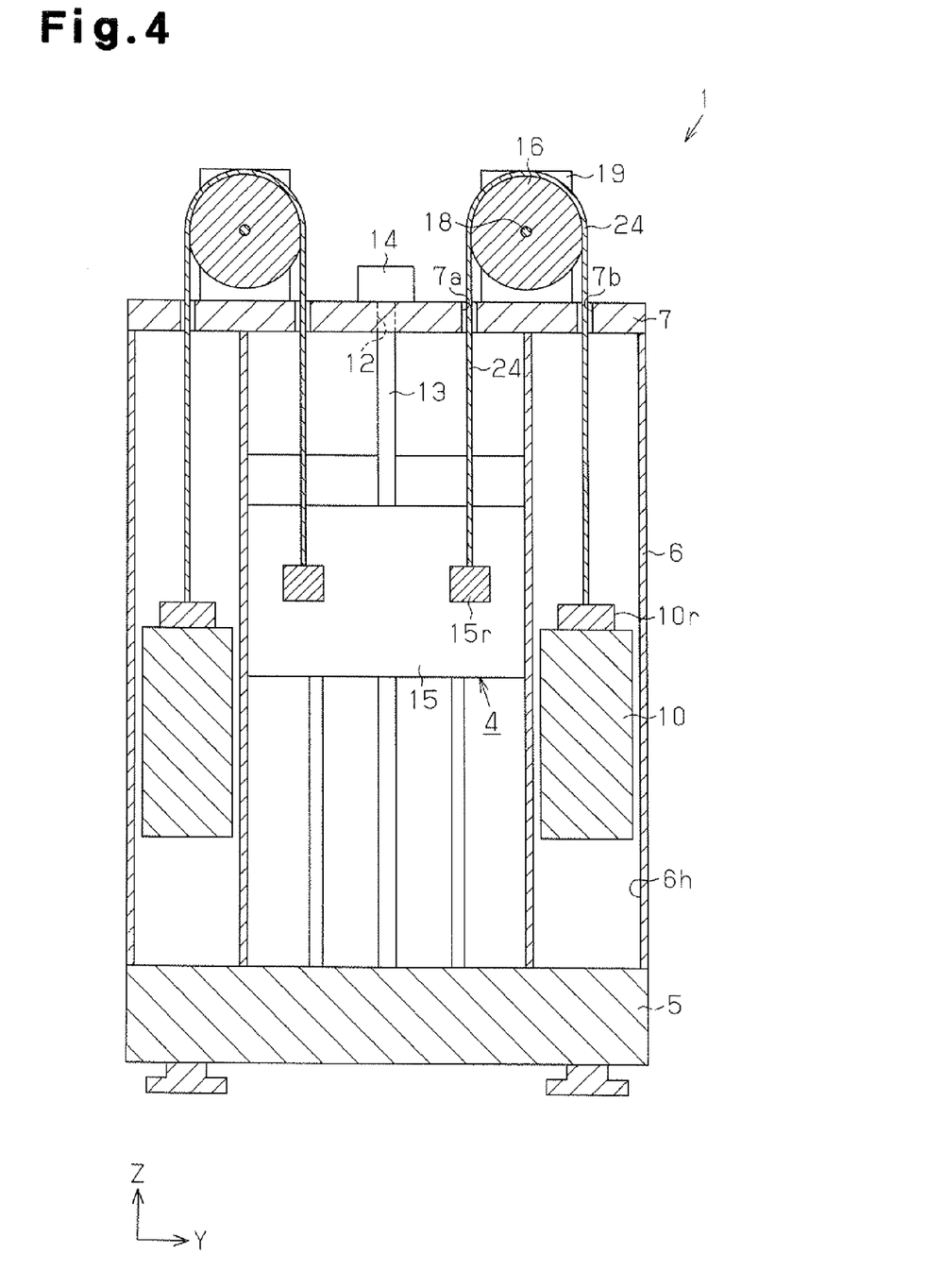
FIG. 4 is a cross-sectional view taken along line B-B of FIG. 2.

Two through holes 12 are formed in the ceiling portion 7. As shown in FIG. 3, each through hole 12 is located in a portion of the ceiling portion 7 that is between two support pillars 6 arranged along the direction of arrow Y in FIG. 3. A ball screw shaft 13 extending along the direction of arrow Z is passed through each through hole 12. Each ball screw shaft 13 is permitted to rotated in the corresponding through hole 12. The upper end of each ball screw shaft 13 is coupled to a servomotor 14 provided on the ceiling portion 7, and the lower end of each ball screw shaft 13 is rotatably supported by a bearing (not shown) provided on the base 5. Each ball screw shaft 13 is rotated when the corresponding servomotor 14 is driven. The injection molding machine 1 includes a movable body 4, which is lifted or lowered along the ball screw shafts 13 in response to rotation of the ball screw shafts 13. The movable body 4 includes two ball nuts 15, a movable base 17, and a lower mold 20. Each ball nut 15 is screwed onto the corresponding ball screw shaft 13. The movable base 17 is fixed between and supported by the ball nuts 15 and has an upper surface parallel to the installation surface. The lower mold 20 is fixed to and supported on the upper surface of the movable base 17. At normal times, that is, when the injection molding machine 1 is not operating to perform injection molding, the movable body 4 is at a position close to the base 5, that is, at a lower position as shown in FIGS. 1 and 3.

Figure 2:
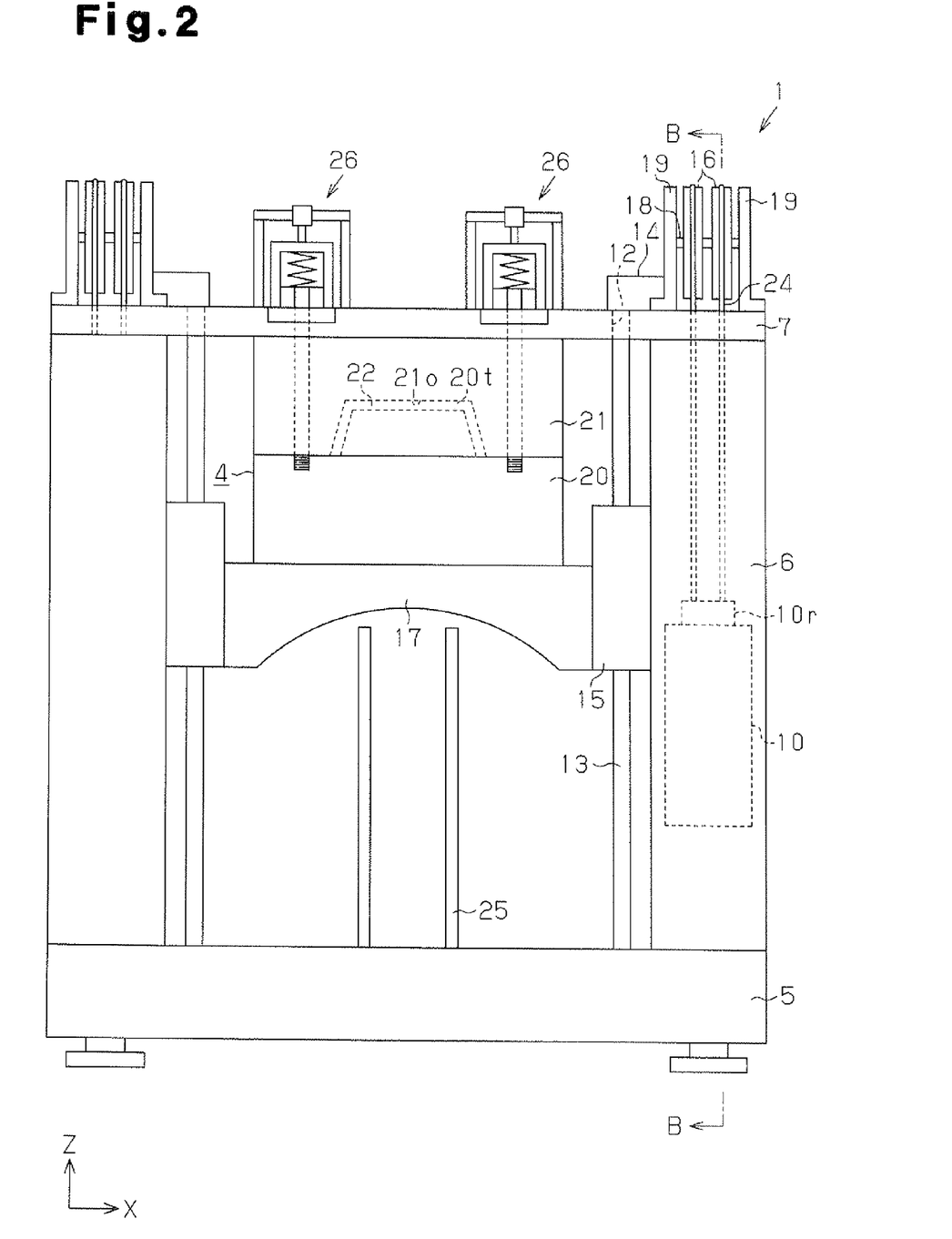
FIG. 2 is a front view illustrating the vertical type injection molding machine of FIG. 1, showing a state where the molds are closed.

An upper mold 21 is fixed to the lower surface of the ceiling portion 7 so as to face the lower mold 20. The lower mold 20 and the upper mold 21 are arranged along the vertical direction. By moving the movable body 4 upward by the operation of the servomotors 14, the upper surface of the lower mold 20 contacts the lower surface of the upper mold 21 as shown in FIG. 2. At this time, a mold projection 20t formed on the upper surface of the lower mold 20 enters a mold recess 21o formed in the lower surface of the upper mold 21, so that a cavity 22, which is defined by the mold projection 20t and the mold recess 21o, is formed between the upper mold 21 and the lower mold 20.

An ejection mechanism is provided in the base 5 to eject a molded article obtained by the lower mold 20 and the upper mold 21 from the upper mold 21 or the lower mold 20. In the present embodiment, the ejection mechanism is formed by two ejection bars 25 extending from the upper surface of the base 5. When the movable body 4 is at the lower position, that is, when the lower mold 20 is in an open state where the lower mold 20 is away from the upper mold 21, the ejection bars 25 are actuated to be passed upward through the lower mold 20 from below, so as to eject a molded article from the lower mold 20.

In the present embodiment, the following measures are taken to reduce the load on the servomotors 14, which actuate the movable body 4. That is, as shown in FIG. 3, a hollow space 6h is formed inside each of the support pillars 6, which are arranged to surround the upper mold 21 and the movable body 4 including the lower mold 20. A weight 10 is accommodated in each hollow space 6h. That is, the weights 10 are arranged in the area surrounded by the support pillars 6. Each weight 10 is allowed to be lifted and lowered in the hollow space 6h of the corresponding support pillar 6. Pairs of pulleys 16 are provided on the ceiling portion 7. Each pair of pulleys 16 correspond to one of the support pillars 6. Each weight 10 is connected to the movable body 4 (more exactly, a side of the corresponding ball nut 15 that is opposite to the side facing the movable base 17) through two wires 24, which are placed over the corresponding pair of pulleys 16. Each pair of pulleys 16 includes a pulley shaft 18 rotatably supported by a pair of covers 19 sandwiching the pair of pulleys 16. The pulley shafts 18 extend in the direction of arrow X in FIG. 1.

As shown in FIG. 3, two fastening portions 15r are fixed to a side of each ball nut 15 that is opposite to the side facing the movable base 17. Each of the two fastening portions 15r of each ball nut 15 is located on one of the two lines that substantially trisect the side of the ball nut 15 along the direction of arrow Y. Accordingly, the fastening portions 15r are arranged symmetrically. Each fastening portion 15r corresponds to one of the four pairs of pulleys 16. That is, each fastening portion 15r is connected to ends of two wires 24 that are engaged with the corresponding pair of pulleys 16. Ends of two wires 24 placed over each pair of pulleys 16 that are opposite to the ends connected to the corresponding fastening portion 15r are connected to the corresponding weight 10, more specifically, to a fastening portion 10r of the weight 10. First through holes 7a and second through holes 7b are formed in the ceiling portion 7. Portions of the two wires 24 that extend from the corresponding pair of pulleys 16 to the corresponding fastening portion 15r are received by one of the first through holes 7a. Portions of the two wires 24 that extend from the corresponding pair of pulleys 16 to the corresponding weight 10 are received by one of the second through holes 7b.

The sum of the weights of the weights 10, which pull the movable body 4 through the wires 24, is set to be the same as the weight of the movable body 4, that is, the sum of the weights of the ball nuts 15, the movable base 17, and the lower mold 20. Therefore, the weights 10 and the movable body 4 balance with each other. That is, the weights 10 function as a counterweight of the movable body 4. The four weights 10 have the same weight. That is, the weight of each weight 10 is equal to the value obtained by dividing the weight of the movable body 4 by four, which is the number of the weights 10. The weights 10 having the same weight are advantageous in supporting the movable body 4 with the weight 10 in a balanced manner. Since the wires 24 and the pair of pulleys 16 are provided to correspond to each of the weights 10, the machine 1 is advantageous in dispersing the stress that acts on the wires 24 and the pairs of pulleys 16 due to supporting of the movable body 4 and the weights 10.

Figure 5:
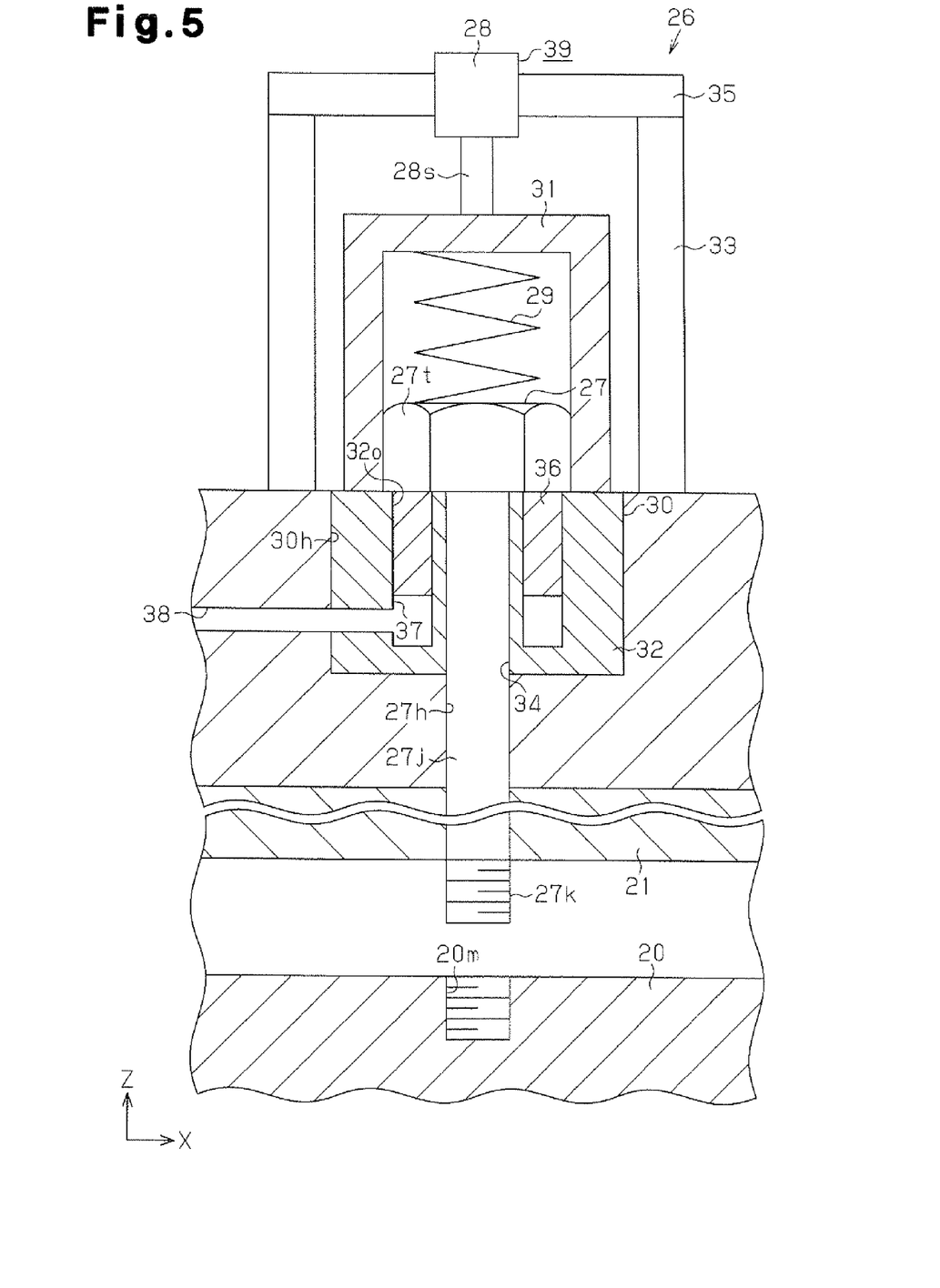
FIG. 5 is a cross-sectional view showing a clamping mechanism of the vertical type injection molding machine shown in FIG. 1.

As shown in FIG. 1, a plurality of clamping mechanisms 26 are provided on the ceiling portion 7. At molding operation using the lower mold 20 and the upper mold 21, the clamping mechanisms 26 prevent the lower mold 20 from separating from the upper mold 21 by the injection pressure of molten resin injected into the cavity 22. The clamping mechanisms 26 are provided at equal intervals about the periphery of the lower and upper molds 20, 21, so as to uniformly press the lower mold 20 and the upper mold 21 to each other. As shown in FIG. 5, each clamping mechanism 26 includes a bolt 27, a drive mechanism 39, a coil spring 29, an annular hydraulic washer 30, which is a cylinder 32, and a cylindrical body 31.

More specifically, each hydraulic washer 30 is fitted in one of washer holes 30h formed in the upper surface of the ceiling portion 7. A through hole 27h extends from the bottom of each washer hole 30h. Each through hole 27h is coaxial with the corresponding washer hole 30h and extends through the ceiling portion 7 and the upper mold 21. The center hole of each hydraulic washer 30 fitted in the corresponding washer hole 30h and the corresponding through hole 27h form a bolt hole 34. The shank 27j of a bolt 27 is passed through each bolt hole 34, and the lower end 27k of the shank 27j projects from the lower surface of the upper mold 21. An external thread is formed at the lower end 27k of each bolt 27. Internal thread holes 20m are provided at positions on the upper surface of the lower mold 20 that correspond to the lower ends 27k of the bolts 27. The head 27t of each bolt 27 is engaged with the periphery of the center hole of the corresponding hydraulic washer 30. A cylindrical body 31 is fitted to the head 27t of each bolt 27 from above. The shape of the inner circumferential surface of the cylindrical body 31 corresponds to the head 27k. Inside each cylindrical body 31, the coil spring 29 is arranged between the ceiling surface of the cylindrical body 31 and the head 27t of the corresponding bolt 27. Each coil spring 29 always urges the corresponding bolt 27 downward. Each drive mechanism 39 operates to rotate the corresponding cylindrical body 31 and bolt 27. More specifically, each drive mechanism 39 includes a plurality of support pillars 33, which extend upward from the upper surface of the ceiling portion 7 and are arranged to surround the corresponding cylindrical body 31. The support pillars 33 of each drive mechanism 39 support an attachment plate 35, and a clamping motor 28 is attached to the attachment plate 35. The output shaft 28s of each clamping motor 28 is connected to the upper surface of the corresponding cylindrical body 31. Therefore, rotation of the output shaft 28s of each clamping motor 28 is transmitted to the corresponding bolt 27 through the corresponding cylindrical body 31.

Each hydraulic washer 30, or each cylinder 32, receives a piston 36. More specifically, each cylinder 32 has an annular recess 32o opened upward, and the piston 36 is accommodated in the annular recess 32o. The annular recess 32o of each cylinder 32 forms a hydraulic chamber 37, to which oil is supplied from the outside through an oil passage 38. When oil is supplied to the corresponding hydraulic chamber 37, the piston 36 of each cylinder 32 projects from the cylinder 32 and presses the head 27t of the corresponding bolt 27 upward. As a result, the bolts 27 move upward.

Figure 6:
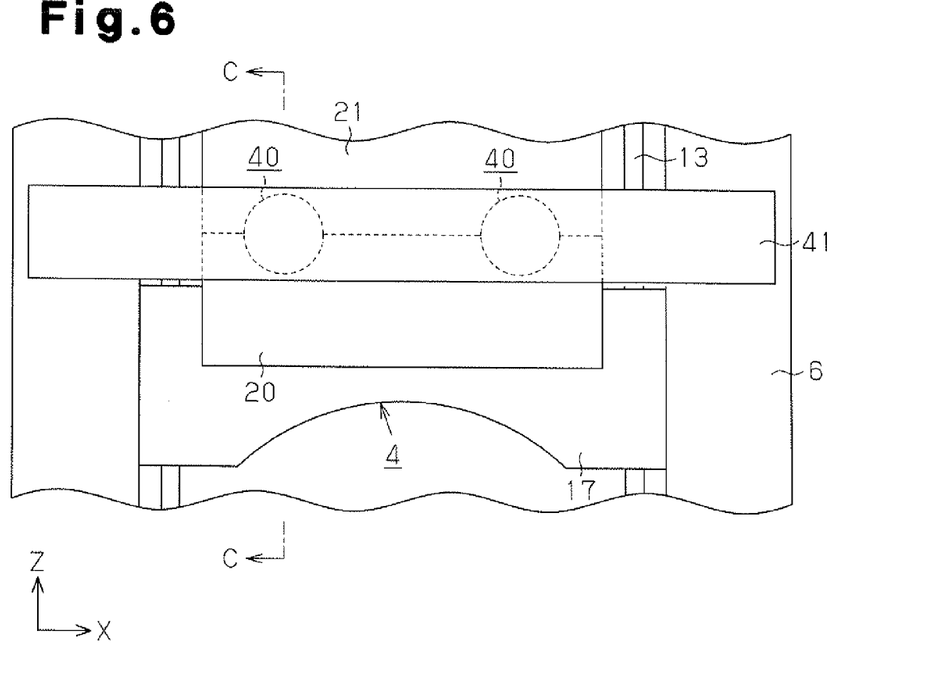
FIG. 6 is a front view showing a demolding mechanism of the vertical type injection molding machine shown in FIG. 1.
Figure 7:
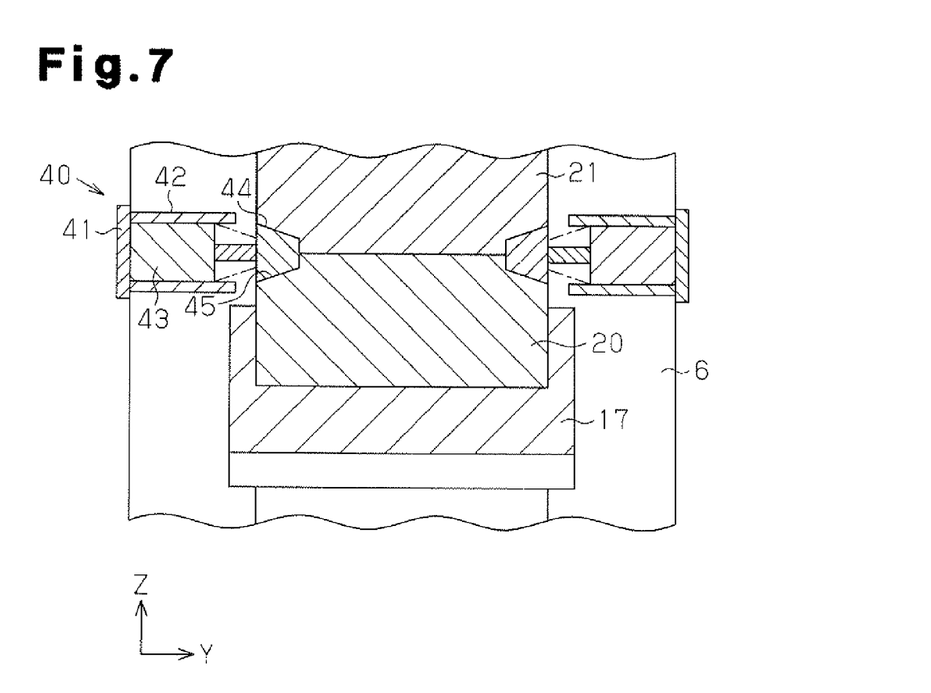
FIG. 7 is a cross-sectional view taken along line C-C of FIG. 6.

The injection molding machine 1 includes a plurality of demolding mechanisms 40 shown in FIGS. 6 and 7. The demolding mechanisms 40 promote separation of the lower mold 20 and the upper mold 21 adhering to a molded article, which is obtained by cooling and solidifying resin in the cavity 22. In other words, the demolding mechanisms 40 promote demolding of the lower and upper molds 20, 21 from each other. A fixing portion 41 extends between two support pillars 6 arranged along the direction of arrow X. Each demolding mechanism 40 is provided on one of the fixing portions 41. Each fixing portion 41 has two of the demolding mechanisms 40 on a surface that faces the lower and upper molds 20, 21. As shown in FIG. 7, each demolding mechanism 40 includes a case 42 attached to the fixing portion 41 and a demolding cylinder 43 accommodated in the case 42. Each demolding cylinder 43 includes a plunger, and a wedge shaped demolding member 44 is provided at the distal end of the plunger. Each demolding member 44 is caused to protrude or retreat in response to supply of oil to the corresponding demolding cylinder 43. Demolding holes 45 are provided between the lower mold 20 and the upper mold 21 when they are joined to each other. When the demolding members 44 enter the demolding holes 45, force in a direction parting the lower and upper molds 20, 21 from each other is applied to the lower and upper molds 20, 21, which promotes the parting of the lower mold 20 and the upper mold 21.

An operation of the injection molding machine 1 will now be described.

At normal times, that is, when the injection molding machine 1 is not operating to perform injection molding, the lower mold 20 is held in a lower portion of the injection molding machine 1 as shown in FIGS. 1 and 3. In this state, where the upper mold 21 and the lower mold 20 are separate from each other, each weight 10 is located at an upper portion in the hollow space 6h of the corresponding support pillar 6, while being hung by the wires 24. On the other hand, the movable body 4 is held at the lower position close to the base J. When the servomotors 14 are driven in the forward direction as injection molding is started, the ball screw shafts 13 are rotated in a predetermined direction. Accordingly, the movable body 4 moves upward. At this time, the weights 10, which balance with the movable body 4, minimizes the load on the servomotors 14 moving the movable body 4 upward.

When the movable body 4 moves upward, the lower end 27k of each bolt 27 projecting from the lower surface of the upper mold 21 eventually contacts the opening of the corresponding internal thread hole 20m of the lower mold 20. In this state, the lower mold 20 and the upper mold 21 are slightly separate from each other. The lower end 27k of each bolt 27 is urged into the corresponding internal thread hole 20m based on the urging of the bolt 27 by corresponding coil spring 29. When the movable body 4 is further lifted, each bolt 27 is moved upward against the urging force of the corresponding coil spring 29, so that the head 27t of the bolt 27 is separated from the corresponding hydraulic washer 30. Thereafter, when the lower mold 20 contacts the upper mold 21, the servomotors 14 are stopped. This forms the cavity 22 to be filled with molten resin between the molds 20, 21. Although the descent of each weight 10 is stopped when the operation of the corresponding servomotor 14 is stopped, an inertial force based on the weight of each weight 10 acts on the weight 10, which momentarily applies a great stress to the corresponding wires 24. However, in the present embodiment, since the weight of each weight 10 is relatively small, the stress that acts on the corresponding wires 24 and the corresponding pair of pulleys 16 is reduced. Therefore, the wires 24 are prevented from being stretched or broken, and the pairs of pulleys 16 are prevented from being deformed.

Thereafter, when the clamping motors 28 are driven in the forward direction with the upper mold 21 and the lower mold 20 contacting each other, the rotation of each clamping motor 28 is transmitted to the head 27t of the corresponding bolt 27 through the corresponding cylindrical body 31, so that the bolt 27 is rotated. As a result, the lower end 27k of each bolt 27 is screwed into the corresponding internal thread hole 20m as shown in FIG. 2. When the head 27t of each bolt 27 contacts the corresponding hydraulic washer 30, the corresponding clamping motor 28 is stopped.

At this time, although the joint between the molds 20, 21 is reinforced by the bolts 27, such reinforcement is in some cases not sufficient for preventing the lower mold 20 and the upper mold 21 from being separated from each other by the injection pressure of the molten resin injected into the cavity 22. Therefore, to achieve the firmer joint between the molds 20, 21, hydraulic oil is supplied to the hydraulic chamber 37 of each clamping mechanism 26 shown in FIG. 5 through the corresponding oil passage 38. This increases the oil pressure in the hydraulic chambers 37, and the increased oil pressure is applied to the pistons 36, so that each piston 36 projects from the corresponding cylinder 32. Each of the projecting cylinders 32 presses the head 27t of the corresponding bolt 27 upward. As a result, the lower mold 20 is pressed against the upper mold 21 through the bolts 27. In this state, an unillustrated injection machine injects molten resin into the cavity 22, so that the cavity 22 is filled with molten resin. Since the lower mold 20 is pressed against and firmly joined to the upper mold 21, the injection pressure of the molten metal does not cause the lower mold 20 to be separated from the upper mold 21. The state in which the hydraulic pressure in the hydraulic chambers 37 is high, that is, the reinforcement of the joint between the molds 20, 21 by the cylinders 32, is maintained until the molten resin in the cavity 22 is cooled and solidified. The resin in the cavity 22 is cooled and solidified to obtain a molded article in the cavity 22.

After the molded article is obtained, the hydraulic oil in each hydraulic chamber 37 is discharged through the corresponding oil passage 38, so that the hydraulic pressure in the hydraulic chamber 37 is lowered. The reinforcement of the joint between the molds 20, 21 by the cylinders 32 is cancelled. Thereafter, the clamping motors 28 are driven in the reverse direction to remove the lower end 27k of each bolt 27 from the corresponding internal thread hole 20m. The rotation of each clamping motor 28 is transmitted to the head 27t of the corresponding bolt 27 through the corresponding cylindrical body 31, so that the bolt 27 is loosened against the urging force of the corresponding coil spring 29. After the lower end 27k of each bolt 27 is removed from the corresponding internal thread hole 20m, the lower mold 20 is permitted to move. In other words, the movable body 4 is permitted to descend. However, since the lower mold 20 and the upper mold 21 adhere to the molded article in the cavity 22, the mold opening, that is, parting of the lower mold 20 and the upper mold 21 from each other, requires a considerable force. Thus, to promote parting of the lower mold 20 and the upper mold 21 from each other, oil is supplied to the demolding cylinder 43 of each demolding mechanism 40, so that the demolding member 44 of the demolding mechanism 40 enter the corresponding demolding hole 45 between the lower mold 20 and the upper mold 21. Accordingly, force in a direction parting the lower and upper molds 20, 21 from each other is applied to the lower and upper molds 20, 21, which promotes the parting of the lower mold 20 and the upper mold 21. Thereafter, when the servomotors 14 are driven in the reverse direction, the lower mold 20 starts being lowered, so that the lower mold 20 is largely separated from the upper mold 21. At this time, the molded article is on the lower mold 20. When the lower mold 20 is separated from the upper mold 21 by a predetermined distance, the molded article is ejected from the lower mold 20 by using the ejection bars 25. The injection molding by the injection molding machine 1 is thus completed.

The above described embodiment has the following advantages.

The movable body 4 is pulled upward by the weights 10 through the wires 24. Since the movable body 4 never free-falls due to its own weight, the servomotors 14 do not need to be driven to maintain the movable body 4 at a predetermined position. This reduces the load on the servomotors 14.

The movable body 4 is supported not by a single weight, but by separately arranged multiple weights 10, each of which is provided with two wires 24 and a pair of pulleys 16. This configuration is advantageous in dispersing the stress acting on the wires 24 and the pairs of pulleys 16 generated by supporting the movable body 4 and the weights 10, ensuring stable operation of the injection molding by the injection molding machine 1 for an extended period of time.

Each weight 10 is accommodated in the hollow space 6h of the corresponding support pillar 6. This configuration is advantageous in reducing the size of the vertical type injection molding machine 1, and prevents vertical movement of the weights 10 from being hindered by external impediments.

Each of the two fastening portions 15r of each ball nut 15 is located on one of the two lines that substantially trisect, along the direction of arrow Y, the side of the ball nut 15 that is opposite to the side facing the movable base 17. Also, the four weights 10 have the same weight. This configuration is advantageous in lifting and lowering the movable body 4 while keeping the movable body 4 in a horizontal position without inclining.

The above described embodiment may be modified as follows.

The number of the support pillars 6 is not limited to four. In place of the support pillars 6, a structure such as a frame-like body or a wall-like body may be used as a support frame.

Each weight 10 does not need to be entirely accommodated in the hollow space 6h of the corresponding support pillar 6, but may be partly or entirely located outside the support pillar 6.

The lift mechanism that lifts and lowers the movable body 4 is not limited to the lift mechanism of the injection molding machine 1, which includes the ball screw shafts 13 and the ball nuts 15, but may be a lift mechanism that lifts and lowers the movable body 4 using a chain belt actuated by a motor.

In the injection molding machine 1 shown in FIG. 1, the lower mold 20 is movable and the upper mold 21 is stationary. However, the molds 20, 21 may be replaced by a movable upper mold and a stationary lower mold. In this case, the clamping mechanisms 26 and the ejection mechanisms are modified as necessary.

Each weight 10 doe not need to be connected to the movable body 4 by two wires 24. That is, the number of the wires 24 connecting each weight 10 to the movable body 4 may be one or more than two.

The number of the weights 10 is not limited to four. Also, only some of the weights 10 may be arranged in the hollow spaces 6h, while the other weights 10 are located outside the hollow spaces 6h of the support pillars 6.

The invention claimed is:

1. A vertical type injection molding machine comprising:
a fixed mold supported by a support frame provided on a base;
a movable body including a movable mold, the movable mold being approached to and moved away from the fixed mold;

a lift mechanism that lifts and lowers the movable body, thereby causing the movable mold to approach and move away from the fixed mold;

a plurality of weights functioning as a counterweight of the movable body, wherein the total weight of the weights is the same as the weight of the movable body, each weight being coupled to the movable body by a wire; and a plurality of pulleys provided in an upper portion of the support frame, wherein one of the wires is placed over each pulley, each wire connecting the corresponding weight to the movable body, wherein the support frame includes a plurality of support pillars extending in a direction along which the movable body moves, and each weight is accommodated in one of the support pillars so as to be lifted and lowered, and wherein the support pillars are arranged at equal intervals around the movable body, parts that connect the wires to the movable body being symmetrically arranged relative to the movable body, and wherein the weights have a same weight.

2. The vertical type injection molding machine according to claim 1, wherein the support frame is arranged to surround the fixed mold and the movable mold, and wherein the weights are at least partly arranged in an area surrounded by the support frame.

3. The vertical type injection molding machine according to claim 1, including four of the support pillars and four of the weights, and wherein each of the four weights is entirely accommodated in one of the four support pillars.

* * * * *